US009585015B2

(12) United States Patent
Blanco et al.

(10) Patent No.: US 9,585,015 B2
(45) Date of Patent: *Feb. 28, 2017

(54) METHOD AND APPARATUS FOR AUTHENTICATION OF COLLABORATIVE MOBILE DEVICES

(71) Applicant: MOTOROLA SOLUTIONS, INC, Schaumburg, IL (US)

(72) Inventors: Alejandro G. Blanco, Fort Lauderdale, FL (US); Mark A. Boerger, Plantation, FL (US); George S. Hanna, Miami, FL (US); John B. Preston, Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,309

(22) Filed: Apr. 21, 2015

(65) Prior Publication Data

US 2016/0316364 A1    Oct. 27, 2016

(51) Int. Cl.
| | |
|---|---|
| *H04W 12/06* | (2009.01) |
| *H04L 29/06* | (2006.01) |
| *H04W 4/00* | (2009.01) |
| *H04W 12/04* | (2009.01) |
| *H04W 12/08* | (2009.01) |

(52) U.S. Cl.
CPC ......... *H04W 12/06* (2013.01); *H04L 63/0853* (2013.01); *H04W 4/008* (2013.01); *H04W 12/04* (2013.01); *H04W 12/08* (2013.01)

(58) Field of Classification Search
CPC . H04L 63/0492; H04L 63/0853; H04L 63/18; H04W 12/06; H04W 92/18; H04W 4/008; H04W 12/04; H04W 12/08
See application file for complete search history.

(56) References Cited

U.S. PATENT DOCUMENTS

| | | | |
|---|---|---|---|
| 8,850,196 B2 | 9/2014 | Blanco et al. | |
| 2001/0017853 A1* | 8/2001 | Kikuchi | H04N 21/238 370/335 |
| 2006/0293028 A1* | 12/2006 | Gadamsetty | H04L 63/08 455/411 |
| 2009/0157799 A1* | 6/2009 | Sukumaran | G06Q 10/10 709/203 |
| 2010/0177663 A1* | 7/2010 | Johansson | H04W 4/00 370/254 |

(Continued)

*Primary Examiner* — Nizar Sivji

(57) ABSTRACT

A method, apparatus, and system are provided for authentication of collaborative mobile devices. A first mobile device receives a challenge message, derives a first mobile device authentication result based on the challenge message, and conveys, to a second mobile device of a user of the first mobile device, a first short-range wireless signal comprising the challenge message. The second mobile device receives the challenge message from the first mobile device, derives a second mobile device authentication result based on the challenge message, and conveys, to the first mobile device, a first short-range wireless signal comprising the second mobile device authentication result. The first mobile device receives the second mobile device authentication result and authenticates one or more of the first mobile device, the second mobile device, and the user by conveying, to an authenticator device, the first mobile device authentication result and the second mobile device authentication result.

21 Claims, 4 Drawing Sheets

(56) References Cited

U.S. PATENT DOCUMENTS

| | | | |
|---|---|---|---|
| 2011/0238995 A1* | 9/2011 | Blanco | H04L 63/0492 713/173 |
| 2012/0322376 A1* | 12/2012 | Couse | H04M 1/7253 455/41.2 |
| 2014/0366095 A1 | 12/2014 | Blanco et al. | |

* cited by examiner

METHOD AND APPARATUS FOR AUTHENTICATION OF COLLABORATIVE MOBILE DEVICES

FIELD OF THE INVENTION

The present invention relates generally to device authentication and, in particular, to a method and apparatus for authentication of collaborative mobile devices.

BACKGROUND OF THE INVENTION

In many communication scenarios, it is desirable to authenticate or verify the identity of a person and/or a device before allowing access to a network or service. The most common user authentication is to require a login and password. This method has the difficulties of the user having to remember and enter this information. Further compounding the problem, a majority of the radios being used today in public safety have no keypad, display, or other graphical user interface (GUI). Thus, for some radios, a very limited user interface or even no user interface is present to facilitate the authentication process.

The user login and password method is also susceptible to spoofing if the user information is acquired by unauthorized persons. For this reason, this method is sometimes augmented with a second factor for authentication, such as a seeded card that gives other information to enter. Due to these limitations associated with the user login and password method, it would be desirable to have a strong authentication method that does not require the user to input a password or other information to complete the authentication process.

Thus, there exists a need for a method and system for authentication of collaborative mobile devices.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
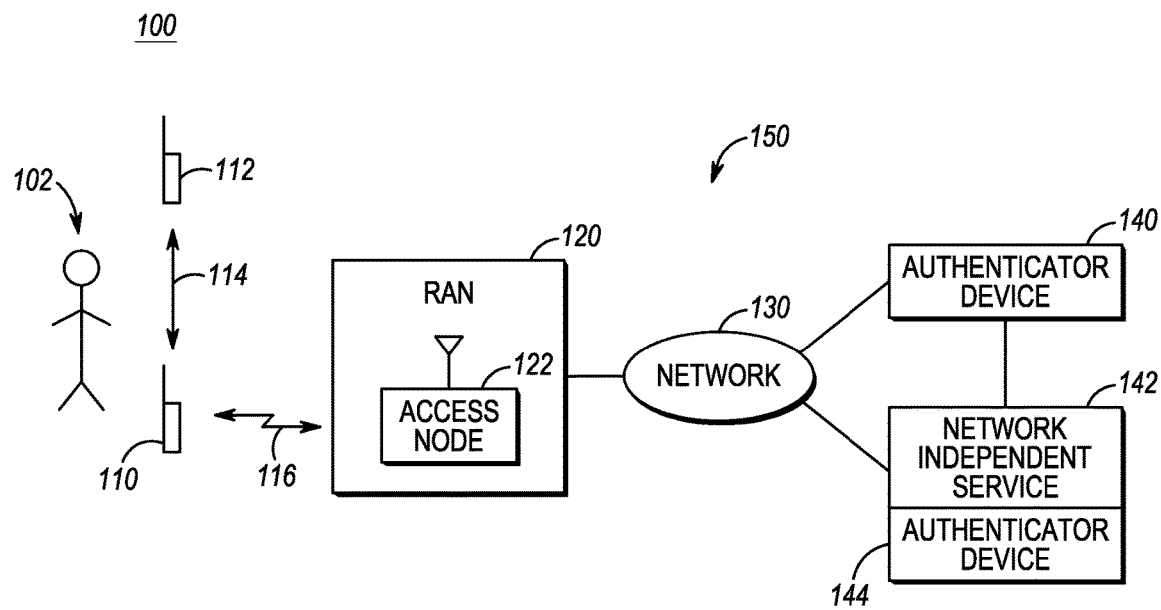
FIG. 1 is a block diagram of a communication system in which authentication methods are implemented in accordance with some embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method, apparatus, and system are provided for authentication of collaborative mobile devices. A first mobile device receives a challenge message, derives a first mobile device authentication result based on the challenge message, and conveys, to a second mobile device of a user of the first mobile device, a first short-range wireless signal comprising the challenge message. The second mobile device receives the challenge message from the first mobile device, derives a second mobile device authentication result based on the challenge message, and conveys, to the first mobile device, a first short-range wireless signal comprising the second mobile device authentication result. The first mobile device receives the second mobile device authentication result and authenticates one or more of the first mobile device, the second mobile device, and the user by conveying, to an authenticator device, the first mobile device authentication result and the second mobile device authentication result.

Generally, an embodiment of the present invention encompasses a method of authentication of collaborative mobile devices. The method includes receiving, by a first mobile device of a user, a challenge message; deriving, by the first mobile device, a first mobile device authentication result based on the challenge message; and conveying, by the first mobile device to a second mobile device of the user, a first short-range wireless signal comprising the challenge message. The method further includes receiving, from the second mobile device, a second short-range wireless signal comprising a second mobile device authentication result, wherein the second mobile device authentication result is based on the challenge message; and authenticating one or more of the first mobile device, the second mobile device, and the user by conveying, by the first mobile device to an authenticator device, the first mobile device authentication result and the second mobile device authentication result.

Another embodiment of the present invention encompasses an apparatus for performing collaborative device authentication using a short-range wireless signal. The apparatus includes a first mobile device comprising a processor and an at least one memory device that is configured to store a set of instructions that, when executed by the processor, cause the processor to perform the following functions: receive a challenge message; derive a first mobile device authentication result based on the challenge message; convey, to a second mobile device of a user of the first mobile device, a first short-range wireless signal comprising the challenge message; receive, from the second mobile device, a second short-range wireless signal comprising the second mobile device authentication result, wherein the second mobile device authentication result is based on the challenge message; and authenticate one or more of the first mobile device, the second mobile device, and the user by conveying, to an authenticator device, the first mobile device authentication result and the second mobile device authentication result.

Yet another embodiment of the present invention encompasses a system for authentication of collaborative mobile devices. The system includes a first mobile device that is configured to receive a challenge message; derive a first mobile device authentication result based on the challenge message; and convey, to a second mobile device of a user of the first mobile device, a first short-range wireless signal comprising the challenge message. The system further includes the second mobile device, wherein the second mobile device is configured to receive the challenge message from the first mobile device; derive a second mobile device authentication result based on the challenge message; and convey, to the first mobile device, a first short-range wireless signal comprising the second mobile device authentication result. Further, the first mobile device further is configured to receive, from the second mobile device, the second mobile device authentication result, and authenticate one or more of the first mobile device, the second mobile device, and the user by conveying, to an authenticator device, the first mobile device authentication result and the second mobile device authentication result.

Turning now to the drawings, the present invention may be more fully described with reference to FIGS. 1-4B. FIG. 1 is a block diagram of an exemplary communication system 100 in accordance with various embodiments of the present invention. Communication system 100 includes multiple mobile devices 110, 112 (two shown), such as but not limited to a cellular telephone, a land mobile radio (LMR), a personal digital assistant (PDA), laptop computer, or personal computer with radio frequency (RF) capabilities, an accessory device such as a remote speaker microphone (RSM), or any other type of mobile device with wide area wireless communication capabilities, such as wide area network (WAN) or wireless local area network (WLAN) capabilities, and/or short-range wireless communication capabilities, such as Bluetooth or near-field communication (NFC) capabilities. In various technologies, mobile devices 110, 112 may be referred to as a mobile station (MS), user equipment (UE), user terminal (UT), subscriber station (SS), subscriber unit (SU), remote unit (RU), access terminal, and so on. Each of the multiple mobile devices 110, 112 belongs to a same user 102 and is configured to operate on a narrowband network or a broadband network and to communicate with infrastructure devices in the corresponding network using any suitable over-the-air protocol and modulation scheme.

Mobile devices 110 and 112 may be "paired" to collaborate so that information sent to, or received from, one of mobile devices 110, 112 may be based on information sent to, or received from, the other mobile device 112, 110, respectively. "Pairing" the devices means that the devices are within range of, and can communicate with, each other via a short-range wireless link 114, such as a Bluetooth link, an NFC link, or a Wi-Fi link. The ability to perform device collaboration between mobile devices 110 and 112 being used by a single user, or subscriber, 102 may enable the user to use either mobile device 110 or mobile device 112 beyond the capabilities offered by such a mobile device.

Communication system 100 further includes a radio access network (RAN) 120 in communication with an authenticator device 140 via a data network 130. Access network 120 includes one or more wireless access nodes 122 (one shown) that each provides wireless communication services to mobile devices residing in a coverage area of the access node via a corresponding air interface, such as mobile device 110 and air interface 116. Air interface 116 includes an uplink and a downlink, which uplink and downlink includes multiple traffic channels and multiple signaling channels. While mobile devices 110 and 112 are depicted in FIG. 1 as being served by a same RAN, in other embodiments of the present invention each of mobile devices 110 and 112 may be served by a different RAN than the other device, which different RANs may implement the same wireless technology or different wireless technologies, or may not be served by any RAN. For example, one of mobile devices 110 and 112 may be a narrowband mobile device, such as an LMR, served by a narrowband RAN and the other of mobile devices 110 and 112 may be a broadband mobile device served by a broadband RAN.

Wireless access node 122 may be any network-based wireless access node, such as a Node B, an evolved Node B (eNB), an access point (AP), or base station (BS). Access network 120 also may include one or more access network controllers (not shown), such as a Radio Network Controller (RNC) or a Base Station Controller (BSC), coupled to the one or more wireless access nodes; however, in various embodiments of the present invention, the functionality of such an access network controller may be implemented in the access node. Authenticator device 140 may be any device that implements methods and protocols consistent with the teachings herein for facilitating user and/or device authentication. In one illustrative implementation, authenticator device 140 may be a server, such as an authentication, authorization, and accounting (AAA) server having a memory, a processor, and a suitable wired and/or wireless interface operatively coupled for communicating with one or more of the multiple devices 110 and 112.

Together, each of the elements of access network 120, such as access node 122, data network 130, authenticator device 140, a server 142, and an authenticator device 144 may be referred to as an infrastructure 150 of communication system 100 and, correspondingly, each of access node 122, data network 130, authenticator device 140, server 142, and authenticator device 144 may be referred to as an infrastructure element. Infrastructure 150 can be any type of communication network, wherein the mobile devices communicate with infrastructure elements using any suitable over-the-air protocol and modulation scheme. Although not shown, infrastructure 150 may comprise a further number of infrastructure elements for a commercial embodiment that are commonly referred to as, but not limited to, bridges, switches, zone controllers, routers, authentication centers, or any other type of infrastructure equipment facilitating communications between entities in a wireless or wired environment. Finally, it should be noted that communication system 100 is illustrated by reference to a limited number of devices for ease of illustration. However, any suitable number of authenticator devices, user devices, networks, and independent services may be implemented in a commercial system without loss of generality of the teachings herein.

The teachings herein are directed to methods for authenticating a user of the multiple mobile devices 110, 112 and/or one or more of the mobile devices. Such methods, for instance as described below by reference to FIGS. 4A and 4B, can be implemented in a variety of use case scenarios, two of which are described below by way of illustration. In one example use case scenario, the user desires to collaboratively use two mobile devices, and operate at least one of the two devices over infrastructure 150, to communicate with one or more other mobile devices (not shown) or with a public safety agency. For instance, the user may use an accessory such as a remote speaker microphone (RSM) with a mobile device while operating the mobile device over infrastructure 150, or the user may collaboratively use a PDA and an LMR to communicate voice and data over infrastructure 150. In such a case, one or more of the multiple mobile devices 110, 112 may be required to authenticate to the infrastructure 150 via an authenticator device 140 before being allowed to access the infrastructure.

In another example use case scenario, the user of multiple ones of the mobile devices 110, 112, may desire to use a service, such as a network independent service provided by server 142, and may, thereby, be required to authenticate his or her identity via authenticator device 144. For instance, the network independent service can be access to national, regional, or state databases that require user identification and validation for access. However, access to any service is covered under this use case scenario.

Figure 2:
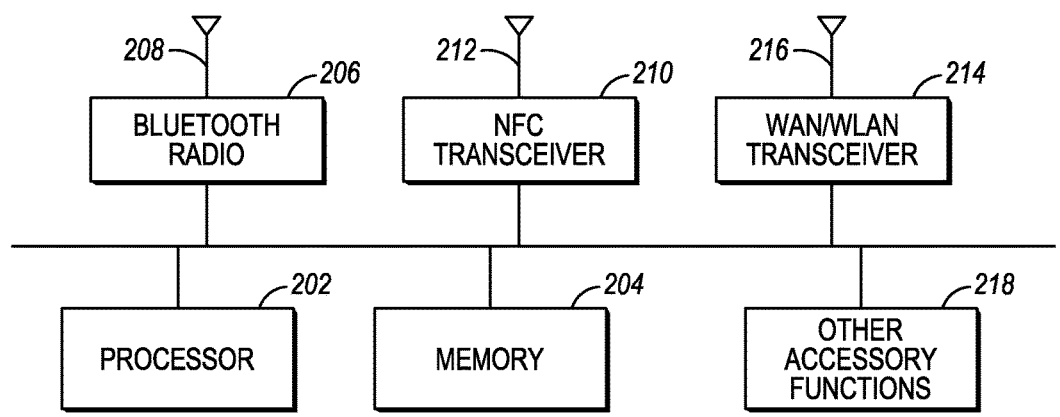
FIG. 2 is a block diagram illustrating a mobile device of the system of FIG. 1 in accordance with some embodiments of the present invention.

Referring now to FIG. 2, a block diagram is provided of a mobile device 200, such as mobile devices 110 and 112, in accordance with some embodiments of the present invention. Mobile device 200 operates under the control of a processor 202, such as one or more microprocessors, microcontrollers, digital signal processors (DSPs), combinations thereof or such other devices known to those having ordinary skill in the art. Processor 202 operates the corresponding mobile device according to data and one or more sets of instructions stored in an at least one memory device 204 such as random access memory (RAM), dynamic random access memory (DRAM), and/or read only memory (ROM) or equivalents thereof, that stores data and instructions that may be executed by the corresponding processor so that the mobile device may perform the functions described herein.

Mobile device 200 is provisioned with a mobile device identifier, such as an electronic serial number (ESN) or other known mobile device identifier that uniquely identifies the mobile device in communication system 100. An ESN is a unique identification number embedded or inscribed on a microchip in the mobile device and which cannot be modified in the field. For instance, wireless phones contain ESNs, and each time a call is placed, the ESN is automatically transmitted to a base station so that a mobile switching office of the mobile device's wireless carrier can check the call's validity.

Further, at least one memory device 204 of mobile device 200 maintains authentication data and instructions for authentication of the mobile device. Such authentication data and programs may include a pre-shared key ('$K_{PSK}$') that is shared between the mobile device and an authenticator device, such as authenticator devices 140 and 144, for example, a first pre-shared key $K_{PSK\_110}$ for mobile device 110 and a second pre-shared key $K_{PSK\_112}$ for mobile device 112. Further, such authentication data and programs may include private key ('$K_{PVT}$') that has a corresponding public key ('$K_{PUB}$'), for example, a first mobile device private key $K_{PVT\_110}$ maintained by first mobile device 110 and that has a corresponding first mobile device public key $K_{PUB\_110}$ and a second mobile device private key $K_{PVT\_112}$ maintained by second mobile device 112 and that has a corresponding second mobile device public key $K_{PUB\_112}$, and that may be used to authenticate the mobile device using well-known Public Key Infrastructure (PKI) techniques. Additionally, such authentication data and programs may include a public key associated with an authenticator device, such as a public key $K_{PUB\_140}$ associated with authenticator device 140, which public key has a corresponding private key that is maintained by the authenticator device, such as a private key $K_{PVT\_140}$ maintained by authenticator device 140.

In one embodiment of the present invention, mobile device 200 may publish its public key ('$K_{PUB}$') to other devices, such as other mobile devices and authenticator devices, such as authenticator devices 140, 144. In other embodiments of the present invention, another device, such as authenticator devices 140 and 144, may be provisioned with the public keys of mobile devices served by the another device. The other mobile devices and/or authenticator devices then may verify a signature (that is, a data field signed using $K_{PVT}$) of the mobile device using the corresponding public key $K_{PUB}$. For example, at least one memory device 204 of mobile device 200 may also maintain a PKI Certificate that maps a public key to the mobile device 200. Mobile device 200 may convey the PKI Certificate to another device, such as authenticator devices 140, 144 or another mobile device, and the PKI Certificate may be used by the another device to verify that the corresponding private key $K_{PVT}$ belongs to mobile device 200.

The authentication data and instructions maintained by at least one memory device 204 of mobile device 200 further includes authentication algorithms for generating authentication information based on the keys maintained by the mobile device. For example, the authentication algorithms may include an algorithm, or function, that generates, as an output, a mobile device authentication result ('$RES_{MD}$') based on inputs of the mobile device's pre-shared key ('$K_{PSK}$'), a random number ('RAND') received from another device, and a seed value ('RS') received from the another device, such as authenticator devices 140, 144. Mobile device 200 then may authenticate with the another device, for example, authenticator devices 140, 144, by conveying the authentication result $RES_{MD}$ to the another device.

Mobile device 200 further includes one or more wireless interfaces 206, 208, 210, 212, 214, 216 for exchanging wireless communications with other mobile devices and/or with infrastructure 150. The one or more wireless interfaces may include one or more wireless interfaces for short-range communications (for example, 10-100 meters or 30-300 feet) using electromagnetic (also known as propagating and "far-field") signals, such as a Bluetooth apparatus that includes a respective Bluetooth radio 206 with a corresponding antenna 208 and/or a near-field communication (NFC) apparatus (or simply near-field apparatus) that includes an NFC transceiver 210 and a resonant NFC antenna 212. Further, the one or more wireless interfaces 206, 208, 210, 212, 214, 216 may include one or more wireless interfaces for wireless wide area communications, such as a wireless local area network (WLAN) and/or a wireless area network (WAN) radio transceiver 214 with a corresponding antenna 216 for generating long range (longer than the short-range) electromagnetic signals. Additionally, mobile device 200 may include other accessory functions 218 including, but not limited to, headsets, car audio kits, text display and keyboard devices, handheld computing devices, scanners, printers, and remote control devices.

Bluetooth radio 206 comprises a conventional Bluetooth transceiver that implements the Bluetooth protocol in accordance with any one or more of Bluetooth Specifications 1.1 ratified as IEEE Standard 802.15.1-2002; Bluetooth Specification 1.2 ratified as IEEE Standard 802.15.1-2005; Bluetooth Specification 2.0+EDR (Enhanced Data Rate) released on Nov. 10, 2004; Bluetooth Core Specification 2.1 adopted by the Bluetooth SIG on Jul. 26, 2007; Bluetooth Specification 3.0 adopted by the Bluetooth SIG on Apr. 21, 2009; and/or subsequent Bluetooth Specification releases. In this embodiment, Bluetooth technology is used for the short-range communications, but any suitable technology can be used for the short-range communications including, but not limited to, Zigbee, IEEE 802.11 a/b/g (Wi-Fi), Wireless USB, etc.

WLAN/WAN transceiver 214 and antenna 216 are also conventional elements that implement one or more protocols that enable the transmission and reception of two-way voice media over the air, for example, via infrastructure 150, with other communication devices (not shown). Such protocols may include, but are not limited to, standards specifications for wireless communications developed by standards bodies such as TIA (Telecommunications Industry Association), OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum. Moreover, other media such as video may be communicated using transceiver 216 and antenna 218 depending on the particular user device.

Regarding the types of signals processed in mobile device 200, a propagating or "far-field" signal is defined as an electromagnetic signal comprising both electric and magnetic field components that is generated by supplying a radio frequency alternating current to an antenna at a transmitting device to generate a signal that self-propagates (that is, a radiating wave), such that the signal can be successfully received at an antenna at a receiving device at distances of well over two meters. A propagating signal obeys a $1/r^2$ propagating law in unobstructed environments, wherein the signal falls off at a rate of about $1/r^2$ where r is the distance between the transmitting and receiving antennas. Thus, in far-field systems (as opposed to near-field systems) that produce propagating signals, all of the transmission energy is designed to radiate into free space.

Contrast this to a non-propagating signal (also referred to in the art as an evanescent signal) that is defined as a signal having a substantially magnetic field component or a substantially electrical field component but not both, which obeys a $1/r^6$ propagating law, wherein the non-propagating radio signal power falls off at a rate of about $1/r^6$ where r is the distance between the transmitting and receiving antennas. Accordingly, a non-propagating signal is localized to its source by lack of an antenna that can produce a radiating wave. Instead, the antenna used to generate a non-propagating signal (termed herein a NFC "resonant antenna") is so electrically small compared to the wavelength of the exciting signal so as to produce no substantial electromagnetic component but only a local electric or magnetic field in the vicinity of the antenna (the non-propagating component of the signal is on the order of $10^6$ times as big as any propagating component of the signal, if one is present). A non-propagating signal is also referred to herein as a "near-field" signal. Moreover, "near-field apparatus" is used to communicate a near-field signal over a communication path termed herein a "near-field link".

The near-field apparatus in mobile device 200, that is, elements 210 and 212, may be "peer" self-powered devices (as opposed to one device being a passive device, which is not self-powered) that establish a near-field link for communicating near-field transmissions. The design of the near-field apparatus generates modulated data signals that are localized around, that is, within six inches of, resonant antenna 212, which provides a large measure of security in transferring data using this technology. In addition, some near-field apparatus embodiments generate such a low frequency signal that it guards against the near-field signal interfering with other media transmissions of the same device or devices in the area.

In one illustrative implementation, the near-field apparatus comprises a microcontroller (which may be incorporated into or separate from processor 202) which when programmed with suitable software (code) functions as the near-field transmitter and receiver. As a transmitter, the microcontroller modulates data (for example, an electronic serial number (ESN) or a random number) onto a carrier wave for transmission as a non-propagating signal via transceiver 210 and near-field resonant antenna 212. As a receiver, the microcontroller receives from the resonant antenna a non-propagating signal comprising data modulated onto a carrier wave.

Near-field resonant antenna 212 can be implemented with a coil device (such as an inductor) and other complimentary circuitry (for example, resistors and capacitors) to generate a substantially magnetic field onto which the data is modulated, that is, the modulated carrier frequency. In one embodiment of the near-field apparatus, the antenna assembly and microprocessor are designed to generate a modulated non-propagating signal centered around 13.56 MHz. Such an embodiment is compatible with NFC standards for peer-to-peer operation, for example, as described in ISO/IEC 18092 NFCIP-1/EMCA-340/ETSI TS 102 190 v1.1.1 (2003-03) and ISO/IEC 21481 NFCIP-2/EMCA-352/ETSI TS 102 312 v1.1.1 (2004-02).

In another embodiment of the near-field apparatus, antenna 212 and the microcontroller are designed to generate a modulated non-propagating signal centered around any suitable "low" frequency, wherein low frequency refers to frequencies of less than 1 MHz. In one example implementation, antenna 212 comprises an antenna assembly including a resistor having a value of 270K ohms, a resistor having a value of 150 ohms, a coil device, which in this case is an inductor, having a value of 7.3 millihenry, an antenna resonating capacitor having a value of 220 picofarads, and a bypass capacitor having a value of 1.0 microfarad. This implementation generates a modulated carrier signal that is centered at about an oscillator frequency of about 125 kHz.

Figure 3:
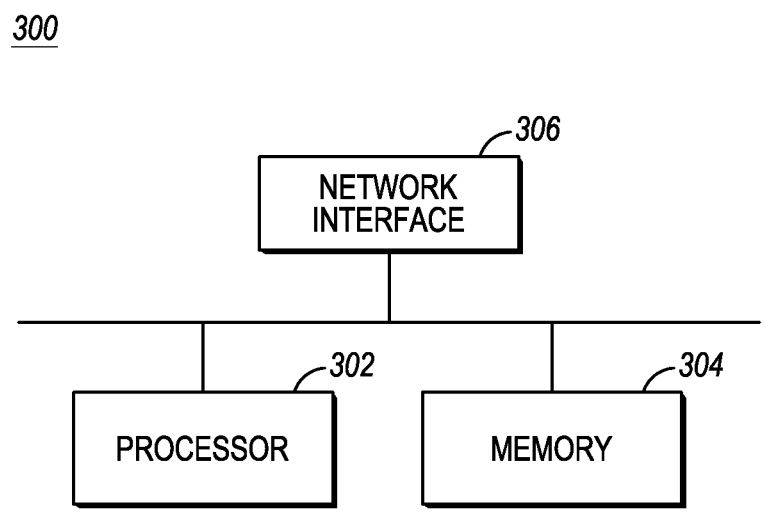
FIG. 3 is a block diagram of an authenticator device of the system of FIG. 1 in accordance with an embodiment of the present invention.

Referring now to FIG. 3, a block diagram is provided of an authenticator device 300, such as authenticator devices 140 and 144, in accordance with an embodiment of the present invention. Authenticator device 300 operates under the control of a processor 302, such as one or more microprocessors, microcontrollers, digital signal processors (DSPs), combinations thereof or such other devices known to those having ordinary skill in the art. Processor 302 operates the corresponding authenticator device according to data and one or more sets of instructions stored in an at least one memory device 304 such as random access memory (RAM), dynamic random access memory (DRAM), and/or read only memory (ROM) or equivalents thereof, that stores data and programs that may be executed by the corresponding processor so that the authenticator device may perform the functions described herein. Authenticator device 300 further includes a network interface 306 for exchanging communications with other elements of infrastructure 150 and, via data network 130 and RAN 120, with one or more of mobile devices 110 and 112.

At least one memory device 304 of authenticator device 300 maintains authentication data and instructions associated with authenticating a mobile device, such as mobile device 110 and 112, served by the authenticator device. For example, such authentication data and programs may include a public key ('$K_{PUB}$') and/or a pre-shared key ('$K_{PSK}$') associated with each mobile device served by the authenticator device, such as a first mobile device public key $K_{PUB\_110}$ and a first pre-shared key $K_{PSK\_110}$ with respect to mobile device 110 and a second mobile device public key $K_{PUB\_112}$ and a second pre-shared key $K_{PSK\_112}$ with respect to mobile device 112. Further, such authentication data and programs may include an authenticator device private key, such as a private key ('$K_{PVT\_140}$') of authenticator device 140, which private key has a corresponding public key ('$K_{PUB\_140}$') that may be distributed by authenticator device 140 to mobile devices, such as mobile devices 110 and 112, served by the authenticator device. Authenticator device 300 may use the public keys to authenticate the corresponding mobile device using well-known PKI techniques. In one embodiment of the present invention, authenticator device may receive the public keys from the corresponding mobile devices when they publish their keys or may obtain the public keys from a public key repository, such as a Certificate Authority (CA). In other embodiments of the present invention, authenticator device 300 may be provisioned with the public keys of the mobile devices by a system operator.

Further, the authentication data and instructions maintained by at least one memory device 304 of authenticator device 300 includes authentication algorithms for generating authentication information based on the keys maintained by, or received by, the authenticator device. For example, the authentication algorithms may include a first algorithm, or function, that generates, as an output, an authentication result ('$RES_{AD}$') based on inputs of at least a portion of each of a random number ('RAND'), a seed value ('RS'), and a pre-shared key ('$K_{PSK}$') generated by the authenticator device. The authentication algorithms further may include an algorithm, or function, that compares the generated authenticator device authentication result ('$RES_{AT}$') to an authentication result received from a mobile device ('$RES_{MD}$') to authenticate the mobile device.

Unless otherwise specified herein, the functionality described herein as being performed by a mobile device, such as mobile devices 110 and 112, and by an authenticator device, such as authenticator devices 140 and 144, is implemented with or in software programs and sets of instructions stored in the respective at least one memory device 204, 304 of the mobile device and authenticator device and executed by the associated processor 202, 302 of the mobile device and authenticator device.

Figure 4A:
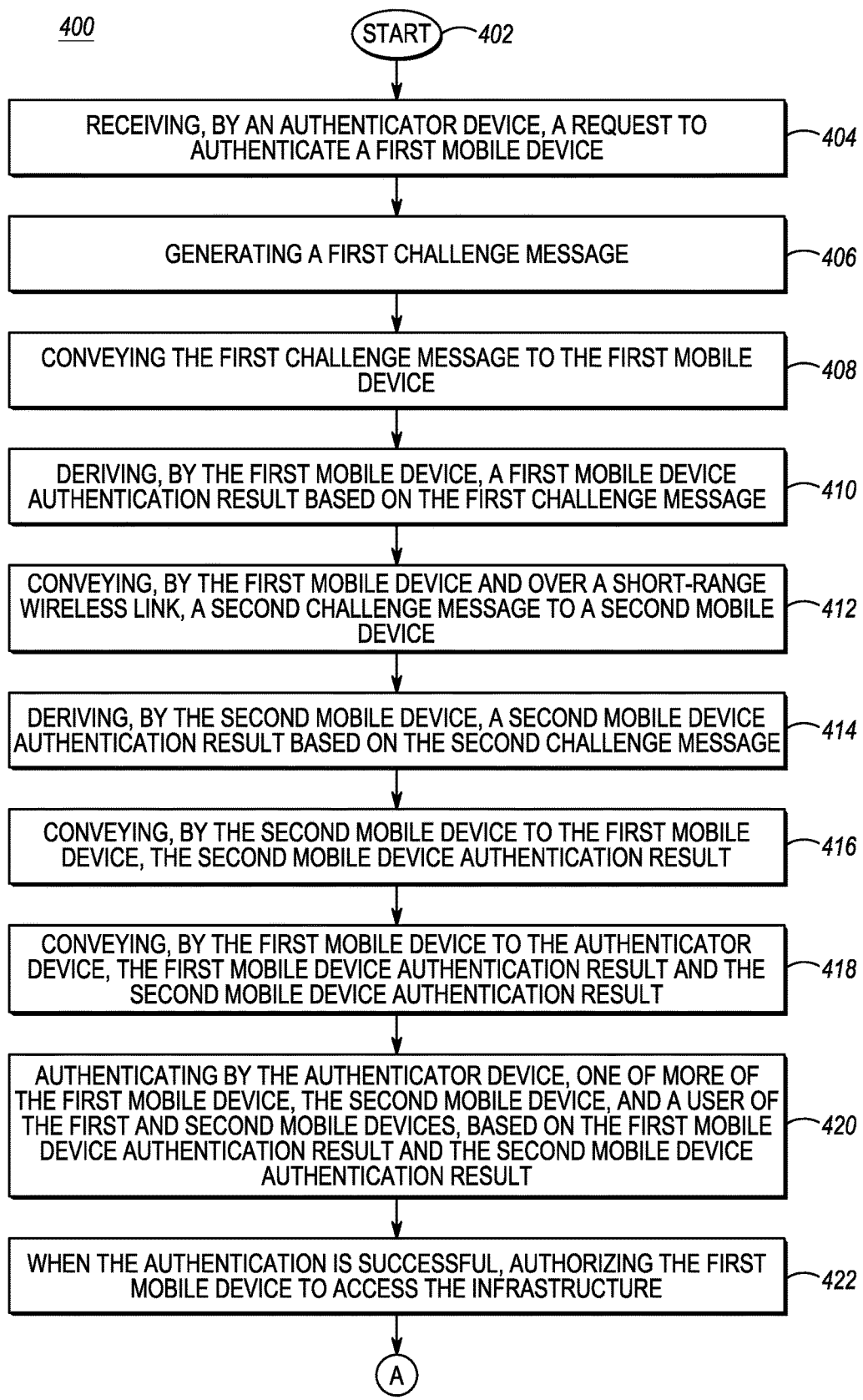
FIG. 4A is a logic flow diagram illustrating a method of performing collaborative mobile device authentication using a short-range wireless signal in accordance with some embodiments of the present invention.
Figure 4B:
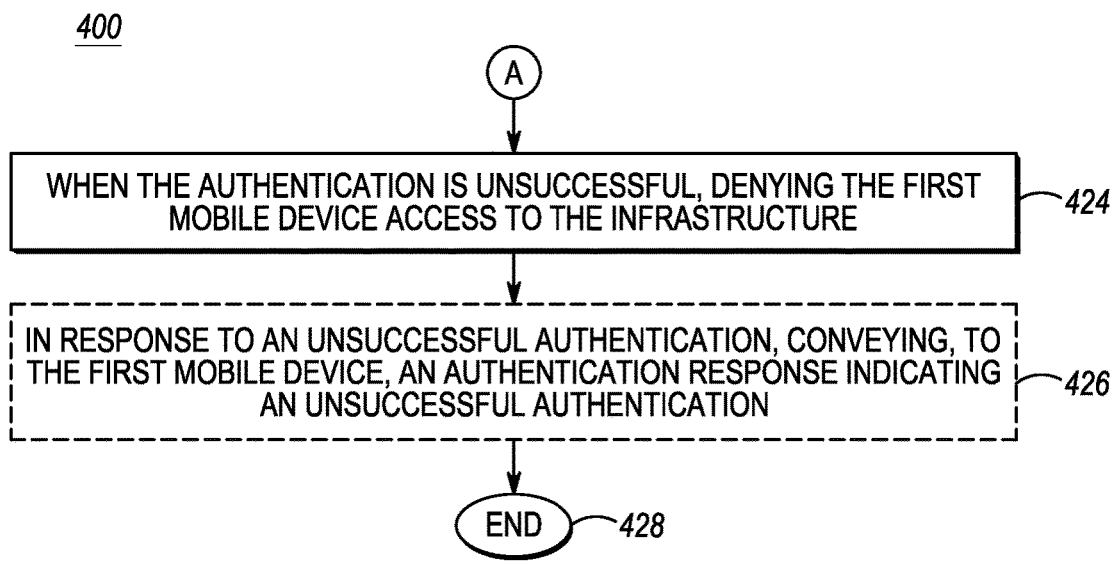
FIG. 4B is a continuation of the logic flow diagram of FIG. 4A illustrating a method of performing collaborative mobile device authentication using a short-range wireless signal in accordance with some embodiments of the present invention.

Turning now to the methods for performing authentication in accordance with various embodiments of the present invention, FIGS. 4A and 4B depict a logic flow diagram 400 that illustrates a method of performing collaborative mobile device authentication using a short-range wireless signal accordance with some embodiments of the present invention. The functionality illustrated by reference to logic flow diagram 400 is performed in an authenticator device, for example, authenticator device 140, and in two mobile devices, for example, mobile devices 110 and 112, and could be performed concurrently with, prior to, or subsequent to a pairing procedure between the mobile devices. Mobile devices 110 and 112 presumably are both operated by a same user, that is, user 102.

Logic flow diagram 400 begins (402) when the authenticator device, that is, authenticator device 140, receives (404) a request to authenticate a first mobile device, that is, mobile device 110. In response to receiving the request, authenticator device 140 generates (406) a first challenge message. In various embodiments of the present invention, the first challenge message may or may not include one or more of a random number ('RAND') and a seed value ('RS'). In other embodiments of the present invention, the first challenge message may additionally, or instead, be signed by authenticator device 140, for example, using the private key of authenticator device 140 ($K_{PVT\_140}$). Authenticator device 140 then conveys (408), via network interface 306, the first challenge message to first mobile device 110 via network 130, RAN 120, and air interface 116.

In response to receiving the challenge message, first mobile device 110 derives (410) a first mobile device authentication result ('$RES_{MD\_110}$') based on the first challenge message.

In one such embodiment, authenticator device 140 signs the first challenge message using the private key of authenticator device 140 ($K_{PVT\_140}$). In such an embodiment, deriving, by the first mobile device, a first mobile device authentication result may comprise validating, by the first mobile device, the signature of authenticator device 140 using the public key associated with the authenticator device 140, that is, $K_{PUB\_140}$, thereby verifying that the signed first challenge message is authentic and is generated by authenticator device 140. In response to validating the signature of authenticator device 140, first mobile device 110 generates a first challenge response message, that serves as a first mobile device authentication result, for conveyance back to authenticator device 140. Further, first mobile device 110 may sign the first challenge response message using the first private key $K_{PVT\_110}$ to produce a signed first challenge response message that the first mobile device stores in its at least one memory device 204.

In another embodiment of the present invention, wherein the first challenge message includes the random number ('RAND') and the seed value ('RS'), first mobile device 110 may derive a first mobile device authentication result ('$RES_{MD\_110}$') by executing a first mobile device algorithm, or function, that generates, as an output, the first mobile device authentication result $RES_{MD\_110}$ based on inputs of at least a portion of the random number RAND, at least a portion of the seed value RS, and at least a portion of a first pre-shared key ('$K_{PSK\_110}$') maintained in at least one memory device 204 of the first mobile device, which pre-shared key is pre-shared with authenticator device 140.

Either concurrent with, prior to, or after performing, step 410, first mobile device 110 conveys (412), to a second mobile device 112 and over short-range wireless link 114, a first short-range wireless signal comprising the second challenge message. In one embodiment, in conveying the second challenge message, first mobile device 110 merely may forward the first challenge message received by the first mobile device from authenticator device 140. As described above, above, such a challenge message may be signed by authenticator device 140 and may or may not include the random number ('RAND') and the seed value ('RS'). In another embodiment of the present invention, wherein the first challenge message is signed by authenticator device 140, first mobile device 110 may strip off the signature of authenticator device 140 (that is, $K_{PVT\_140}$) from the received signed first challenge message and sign the second challenge message with its private key, that is, first private key $K_{PVT\_110}$, to produce a signed second challenge response message and then convey the signed second challenge message to second mobile device 112. In either event, when the second challenge message is signed, second mobile device 112 may verify the signed second challenge message using the public key corresponding to the private key used to sign the second challenge message, that is, public key $K_{PUB\_140}$ associated with authenticator device 140 or public key $K_{PUB\_110}$ associated with mobile device 110.

In yet another such embodiment wherein the first challenge message is signed, first mobile device 110 may generate the second challenge message by stripping off the signature of authenticator device 140 (that is, authenticator device private key $K_{PVT\_140}$) from the received signed first challenge message and convey the second challenge message, without the signature of authenticator device 140 or of first mobile device 110, to second mobile device 112. In this last instance, second mobile device 112 may verify the second challenge message based on a trust relationship developed between the first and second mobile devices through the pairing of the devices.

In response to receiving the second challenge message, second mobile device 112 derives (414) a second mobile device authentication result based on the second challenge message and conveys (416), back to first mobile device 110 and over short-range wireless link 114, a second short-range signal comprising the second mobile device authentication result.

In one such embodiment, wherein the second challenge message is signed using the private key associated with mobile device 110, $K_{PVT\_110}$, or the private key of the authenticator device, $K_{PVT\_140}$, second mobile device 112 may maintain the corresponding public key $K_{PUB\_110}$ or $K_{PUB\_140}$ in at least one memory device 204 of the second mobile device. In such an embodiment, deriving, by second mobile device 112, a second mobile device authentication result may comprise validating, by the second mobile device, the signature of first mobile device 110 or authenticator device 140, whichever is appropriate, based on the public key $K_{PUB\_110}$ or $K_{PUB\_140}$, thereby verifying that the signed second challenge message is authentic. In response to validating the signature of the second challenge message, second mobile device 112 generates a second challenge response message that serves as the second mobile device's authentication result for conveyance back to first mobile device 110. Further, second mobile device 110 may sign the second challenge response message using its own, second private key ('$K_{PVT\_112}$') (which has a corresponding second public key '$K_{PUB\_112}$') to produce a signed second challenge response message and convey the signed second challenge response message back to authenticator device 140.

In another embodiment of the present invention, wherein the second challenge message includes the random number RAND and the seed value RS, second mobile device 110 may derive a second mobile device authentication result ('$RES_{MD\_112}$') by executing a second mobile device algorithm, or function, that generates, as an output, the second mobile device authentication result $RES_{MD\_112}$ based on inputs of at least a portion of the random number RAND, at least a portion of the seed value RS, and at least a portion of a second pre-shared key ('$K_{PSK\_112}$') maintained in at least one memory device 204 of the second mobile device.

In response to receiving the second mobile device authentication result from second mobile device 112, first mobile device 110 then conveys (418) the first mobile device authentication result, generated by first mobile device 110, and the second mobile device authentication result, received from second mobile device 112, to authenticator device 140 via air interface 116, RAN 120, and network 130. In the event that the second mobile device authentication result is a second challenge response message signed by second mobile device 112, first mobile device 110 optionally may also sign the second mobile device authentication result using its private key $K_{PVT\_110}$. In such an event, the second mobile device authentication result conveyed by the second mobile device to authenticator device 140 may comprise the second challenge response message signed by both second mobile device 112, using its private key $K_{PVT\_112}$, and by the first mobile device 110, using its private key $K_{PVT\_110}$. The signing of the second mobile device authentication result by both first mobile device 110 and second mobile device 112 serves to further evidence that a collaborative link is established between the first and second mobile devices.

In response to receiving the first and second mobile device authentication results from first mobile device 110, authenticator device 140 authenticates (420) one or more of first mobile device 110, second mobile device 112, and the user 102 of the first and second mobile devices based on the first and second mobile device authentication results.

In one embodiment of the present invention, wherein the first mobile device authentication result is a first challenge response message signed by the first private key $K_{PVT\_110}$ and the second mobile device authentication result is a second challenge response message signed by the second private key $K_{PVT\_112}$ and optionally also by first private key $K_{PVT\_110}$, authenticator device 140 may authenticate the first and second challenge response messages by using first and second public keys, that is, $K_{PUB\_110}$ and $K_{PUB\_112}$, corresponding to the private keys used to sign the authentication results, which first and second public keys are maintained in at least one memory device 304 of the authenticator device. Authenticator device 140 then validates the signature of first mobile device 110 of the signed first challenge response message and the signature of second mobile device 112 of the signed second challenge response message using the first and second public keys $K_{PUB\_110}$ and $K_{PUB\_112}$, respectively, thereby verifying that the signed first and second challenge response messages are authentic and were generated by the first and second mobile devices, respectively, resulting in a successful authentication. The first and second public keys, that is, $K_{PUB\_110}$ and $K_{PUB\_112}$, may be derived by authenticator device 140 from Public Key Infrastructure (PKI) Certificates provided to the authenticator device by first mobile device 110 and second mobile device 112, respectively, or the authenticator device may obtain, from a Certificate Authority (CA), PKI Certificates associated with each of first mobile device 110 and second mobile device 112.

In another embodiment of the present invention, wherein the first mobile device authentication result is the output ($RES_{MD\_110}$) of the first algorithm executed by first mobile device 110 using inputs RAND, RS, and $K_{PSK\_110}$, and the second mobile device authentication result is the output ($RES_{MD\_112}$) of the second algorithm executed by second mobile device 112 using inputs RAND, RS, and $K_{PSK\_112}$, authenticator device 140 may authenticate the first and second authentication results by executing similar algorithms using the first and second pre-shared keys $K_{PSK\_110}$ and $K_{PSK\_112}$ maintained in at least one memory device 304 of the authenticator device 140. That is, authenticator device 140 executes a first authenticator device algorithm, or function, that generates, as an output, a first authenticator device authentication result ('$RES_{AD\_110}$') based on inputs of at least a portion of each of the random number RAND and the seed value RS included in the first challenge message and at least a portion of the first pre-shared key $K_{PSK\_110}$, and executes a second authenticator device algorithm, or function, that generates, as an output, a second authenticator device authentication result ('$RES_{AD\_112}$') based on inputs of at least a portion of each of the random number RAND and the seed value RS included in the first challenge message and at least a portion of the second pre-shared key $K_{PSK\_112}$.

Authenticator device 140 then authenticates first mobile device 110 by comparing the first authenticator device authentication result ('$RES_{AD\_110}$') generated by the authenticator device to the first mobile device authentication result ('$RES_{MD\_110}$') received from first mobile device 110, and comparing the second authenticator device authentication result ('$RES_{AD\_112}$') generated by the authenticator device to the second mobile device authentication result ('$RES_{MD\_112}$') received from first mobile device 110. When the first authenticator device authentication result ('$RES_{AD\_110}$') matches the first mobile device authentication result ('$RES_{MD\_110}$') and the second authenticator device authentication result ('$RES_{AD\_112}$') matches the second mobile device authentication result ('$RES_{MD\_112}$'), then the authentication is successful.

In response to successfully authenticating the first and second mobile device authentication results, authenticator device 140 authorizes (422) the first mobile device to access infrastructure 150. However, when one of the first and second signed challenge response messages is cannot be verified, or when the first authenticator device authentication result ('$RES_{AD\_110}$') does not match the first mobile device authentication result ('$RES_{MD\_110}$') or the second authenticator device authentication result ('$RES_{AD\_112}$') does not match the second mobile device authentication result ('$RES_{MD\_112}$'), then the authentication of first mobile device 110 is unsuccessful, that is, fails, and authenticator device 140 denies (424) the first mobile device to access infrastructure 150. When the authentication fails, authenticator device 140 may convey (426), to the first mobile device, an authentication response that indicates an unsuccessful, or failed, authentication. Logic flow 400 then ends (428).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of authentication of collaborative mobile devices, the method comprising:
   receiving, by a first mobile device of a user, a challenge message, wherein the challenge message is signed by a private key of an authenticator device;
   maintaining, by the first mobile device, a public key for the authenticator device;
   validating, by the first mobile device, a signature of the authenticator device using the public key for the authenticator device;
   in response to validating the signature of the authenticator device, deriving a challenge response message based on the challenge message;
   signing, by the first mobile device and using the private key, the challenge response message to produce a signed challenge response message;
   conveying, by the first mobile device to the authenticator device, a first mobile device authentication result comprises conveying the signed challenge response message;
   conveying, by the first mobile device to a second mobile device of the user, a first short-range wireless signal comprising the challenge message;
   receiving, from the second mobile device, a second short-range wireless signal comprising a second mobile device authentication result, wherein the second mobile device authentication result is based on the challenge message; and
   authenticating one or more of the first mobile device, the second mobile device, and the user by conveying, by the first mobile device to the authenticator device, the first mobile device authentication result and the second mobile device authentication result.

2. The method of claim 1, further comprising authenticating, by the authenticator device, the first mobile device based on the first mobile device authentication result and the second mobile device authentication result.

3. The method of claim 2, wherein the authenticating is for at least one of access to an access network or access to a service.

4. The method of claim 1, further comprising:
   deriving, by the second mobile device, the second mobile device authentication result based on the challenge message; and
   conveying, by the second mobile device to the first mobile device, the second short-range wireless signal comprising the second mobile device authentication result.

5. The method of claim 1, wherein the challenge message comprises a random number and a seed value,
   wherein the method further comprises maintaining, by the first mobile device, a pre-shared key that is shared with the authenticator device, and
   wherein deriving the first mobile device authentication result comprises deriving the first mobile device authentication result as a function of at least a portion of the random number, at least a portion of the seed value, and at least a portion of the pre-shared key.

6. The method of claim 5, wherein the pre-shared key is a first pre-shared key and wherein the method further comprises:

maintaining, by the second mobile device, a second pre-shared key that is shared with the authenticator device;
   deriving, by the second mobile device, the second mobile device authentication result as a function of at least a portion of the random number, at least a portion of the seed value, and at least a portion of the second pre-shared key; and
   conveying, by the second mobile device to the first mobile device, the second short-range wireless signal comprising the second mobile device authentication result.

7. The method of claim 1, wherein the private key is a first private key, wherein the challenge response message is a first challenge response message, wherein the signed challenge response message is a signed first challenge response message, wherein the method further comprises:
   maintaining, by the second mobile device, the public key for the authenticator device;
   receiving, by the second mobile device, the challenge message;
   validating, by the second mobile device, the signature of the authenticator device based on the public key for the authenticator device;
   in response to validating the signature of the authenticator device, deriving, by the second mobile device, a second challenge response message based on the challenge message;
   signing, by the second mobile device and using on the second private key, the second challenge response message to produce a signed second challenge response message; and
   wherein receiving, by the first mobile device, the second mobile device authentication result comprises receiving the signed second challenge response message.

8. The method of claim 1, wherein the method further comprises:
   maintaining, by the first mobile device, a pre-shared key that is shared with the authenticator device; and
   wherein conveying by the first mobile device to an authenticator device, the first mobile device authentication result and the second mobile device authentication result comprises encrypting the second mobile device authentication result using the pre-shared key.

9. The method of claim 1, wherein the second mobile device authentication result received from the second mobile device is signed by the second mobile device and wherein conveying by the first mobile device to the authenticator device, the first mobile device authentication result and the second mobile device authentication result further comprises:
   signing, by the first mobile device, the second mobile device authentication result using a private key; and
   wherein conveying, by the first mobile device to the authenticator device, the second mobile device authentication result comprises conveying the second mobile device authentication result signed by the first mobile device.

10. An apparatus for performing collaborative device authentication using a short-range wireless signal, the apparatus comprising:
    a first mobile device comprising:
    a processor;
    an at least one memory device that is configured to store a set of instructions that, when executed by the processor, cause the processor to perform the following functions:

receive a challenge message, wherein the challenge message is signed by a public key for an authenticator device;
maintain the public key for the authenticator device;
derive a first mobile device authentication result based on the challenge message by:
  validating a signature of the authenticator device using the public key for the authenticator device;
  in response to validating the signature of the authenticator device, deriving a challenge response message based on the challenge message;
  signing the challenge response message using a private key to produce a signed challenge response message; and
  conveying the first mobile device authentication result by conveying the signed challenge response message;
convey, to a second mobile device of a user of the first mobile device, a first short-range wireless signal comprising the challenge message;
receive, from the second mobile device, a second short-range wireless signal comprising the second mobile device authentication result, wherein the second mobile device authentication result is based on the challenge message; and
authenticate one or more of the first mobile device, the second mobile device, and the user by conveying to the authenticator device, the first mobile device authentication result and the second mobile device authentication result.

11. The apparatus of claim 10, further comprising the authenticator device and wherein the authenticator device is configured to:
authenticate the first mobile device based on the first mobile device authentication result and the second mobile device authentication result.

12. The apparatus of claim 11, wherein the authenticator device is configured to authenticate the first mobile device by authenticating the first mobile device for at least one of access to an access network or access to a service.

13. The apparatus of claim 10, further comprising the second mobile device and wherein the second mobile device is configured to:
derive the second mobile device authentication result based on the challenge message;
convey, to the first mobile device, the second short-range wireless signal comprising the second mobile device authentication result.

14. The apparatus of claim 10,
wherein the challenge message comprises a random number and a seed value,
wherein the at least one memory device is configured to maintain a pre-shared key that is shared with the authenticator device, and
and wherein the set of instructions, when executed by the processor, cause the processor to derive the first mobile device authentication result as a function of at least a portion of the random number, at least a portion of the seed value, and at least a portion of the pre-shared key.

15. The apparatus of claim 14, wherein the pre-shared key is a first pre-shared key, wherein the apparatus further comprises the second mobile device, and wherein the second mobile device is configured to:
maintain a second pre-shared key that is shared with the authenticator device;
derive the second mobile device authentication result as a function of at least a portion of the random number, at least a portion of the seed value, and at least a portion of the second pre-shared key; and
convey, to the first mobile device, the second short-range wireless signal comprising the second mobile device authentication result.

16. The apparatus of claim 10, wherein the private key is a first private key, wherein the challenge response message is a first challenge response message, wherein the signed challenge response message is a first signed challenge response message, wherein the apparatus further comprises the second mobile device, and wherein the second mobile device is configured to:
maintain the public key for the authenticator device;
receive the challenge message;
validate, the signature of the authenticator device of the challenge message based on the public key for the authenticator device;
in response to validating the signature of the authenticator device, derive a second challenge response message based on the challenge message; and
sign, using on a second private key, the second challenge response message to produce a signed second challenge response message; and
wherein the set of instructions, when executed by the processor, cause the processor to receive, from the second mobile device, the second mobile device authentication result by receiving the signed second challenge response message.

17. The apparatus of claim 10, wherein the least one memory device is configured to maintain a pre-shared key that is shared with the authenticator device and wherein set of instructions, when executed by the processor, cause the processor to convey the first mobile device authentication result and the second mobile device authentication result by encrypting the second authentication result using the pre-shared key.

18. The apparatus of claim 10, wherein the first mobile device authentication result comprises a first challenge response message signed by a first private key and the second mobile device authentication result comprises a second challenge response message signed by a second private key,
wherein the set of instructions, when executed by the processor, cause the processor to sign the second mobile device authentication result using the first private key; and
wherein the set of instructions, when executed by the processor, cause the processor to convey, to the authenticator device, the second mobile device authentication result by conveying the second mobile device authentication result signed by the first private key.

19. A system for authentication of collaborative mobile devices, the system comprising:
a first mobile device that is configured to:
receive a challenge message, wherein the challenge message is signed by a public key for an authenticator device;
derive a first mobile device authentication result based on the challenge message;
maintain the public key for the authenticator device;
validate a signature of the authenticator device of the challenge message using the public key for the authenticator device;

in response to validating the signature of the authenticator device, derive a challenge response message based on the challenge message;
sign the challenge response message using a private key to produce a signed challenge response message, wherein the first mobile device further is configured to convey a first mobile device authentication result by conveying the signed challenge response message;
convey, to a second mobile device of a user of the first mobile device, a first short-range wireless signal comprising the challenge message;
wherein the second mobile device is configured to:
receive the challenge message from the first mobile device;
derive a second mobile device authentication result based on the challenge message; and
convey to the first mobile device a first short-range wireless signal comprising the second mobile device authentication result; and
wherein the first mobile device further is configured to receive, from the second mobile device, the second mobile device authentication result and authenticate one or more of the first mobile device, the second mobile device, and the user by conveying, to the authenticator device, the first mobile device authentication result and the second mobile device authentication result.

20. The system of claim 19, wherein the challenge message comprises a random number and a seed value,
wherein the first mobile device is configured to maintain a first pre-shared key that is shared with the authenticator device and further is configured to derive the first mobile device authentication result as a function of at least a portion of the random number, at least a portion of the seed value, and at least a portion of the pre-shared key, and
wherein the second mobile device is configured to maintain a second pre-shared key that is shared with the authenticator device and further is configured to derive the second mobile device authentication result as a function of at least a portion of the random number, at least a portion of the seed value, and at least a portion of the pre-shared key.

21. The system of claim 19, wherein the private key is a first private key, wherein the public key is a first public key, wherein the challenge response message is a first challenge response message, wherein the signed challenge response message is a first signed challenge response message, wherein the system further comprises the second mobile device, and wherein the second mobile device is configured to:
maintain the public key for the authenticator device;
receive the challenge message;
validate the signature of the authenticator device of the challenge message;
in response to validating the signature of the authenticator device, derive a second challenge response message based on the challenge message; and
sign, using a second private key, the second challenge response message to produce a signed second challenge response message, wherein the second mobile device further is configured to convey, to the first mobile device, the second mobile device authentication result by receiving the signed second challenge response message.

\* \* \* \* \*